US 10,271,609 B2

(12) United States Patent
Fersaci

(10) Patent No.: US 10,271,609 B2
(45) Date of Patent: Apr. 30, 2019

(54) STEP-ON SHOE COVER AND METHOD OF USE THEREOF

(71) Applicant: Step In LLC, Charlotte, NC (US)

(72) Inventor: Joel Christopher Fersaci, Charlotte, NC (US)

(73) Assignee: STEP IN LLC, Charlotte, NC (US)

( * ) Notice: Subject to any disclaimer, the term of this patent is extended or adjusted under 35 U.S.C. 154(b) by 0 days.

(21) Appl. No.: 15/927,200

(22) Filed: Mar. 21, 2018

(65) Prior Publication Data

US 2018/0279716 A1 Oct. 4, 2018

Related U.S. Application Data

(60) Provisional application No. 62/481,646, filed on Apr. 4, 2017.

(51) Int. Cl.
| | |
|---|---|
| *A43B 3/18* | (2006.01) |
| *F16F 1/02* | (2006.01) |
| *A43B 11/00* | (2006.01) |
| *A43C 11/00* | (2006.01) |

(52) U.S. Cl.
CPC ............ *A43B 3/18* (2013.01); *A43B 11/00* (2013.01); *F16F 1/027* (2013.01); *A43C 11/00* (2013.01); *F16F 2230/0035* (2013.01); *F16F 2234/06* (2013.01); *F16F 2236/027* (2013.01); *F16F 2238/022* (2013.01)

(58) Field of Classification Search
CPC .. A43B 3/16; A43B 3/163; A43B 3/18; A43B 5/18; A43B 5/185; A43C 11/00
See application file for complete search history.

(56) References Cited

U.S. PATENT DOCUMENTS

| | | |
|---|---|---|
| 4,635,755 A | 1/1987 | Arechaga |
| 5,842,290 A | 12/1998 | Mills |
| | (Continued) | |

FOREIGN PATENT DOCUMENTS

| | | | |
|---|---|---|---|
| CN | 204015241 | * | 12/2014 |
| CN | 204015241 U | | 12/2014 |
| | (Continued) | | |

OTHER PUBLICATIONS

International Search Report and Written Opinion dated Jun. 8, 2018 for corresponding PCT/US2018/023891.

*Primary Examiner* — Ted Kavanaugh
(74) *Attorney, Agent, or Firm* — Jeffrey C. Watson; Mathew L. Grell; Grell & Watson Patent Attorneys LLC

(57) ABSTRACT

A press on shoe cover includes a bottom layer and at least one bistable spring band. The bottom layer is sized to cover at least a bottom of a shoe. The at least one bistable spring band is attached to the bottom layer. The at least one bistable spring band having a stable planar position and a bias coiling position. The stable planar position is configured to hold the bottom layer flat. The bias coiling position is configured to wrap the bottom layer around at least the bottom of the shoe. When the shoe cover lays flat on a surface and the bottom of the shoe is pressed down on the shoe cover, the bistable spring band is configured to move to the bias coiling position thereby wrapping the bottom layer around at least the bottom of the shoe and securing the shoe cover on the bottom of the shoe.

18 Claims, 8 Drawing Sheets

(56) References Cited

U.S. PATENT DOCUMENTS

| | | | | |
|---|---|---|---|---|
| 5,909,945 A * | 6/1999 | Noy | ................... | A43C 15/00 |
| | | | | 152/208 |
| 5,921,005 A * | 7/1999 | Bell | ................... | A43C 15/02 |
| | | | | 36/11.5 |
| 5,966,840 A * | 10/1999 | Bell | ................... | A43C 15/02 |
| | | | | 36/7.1 R |
| 7,461,467 B2 * | 12/2008 | Park | ................... | A43B 3/16 |
| | | | | 36/7.6 |
| 8,474,153 B2 | 7/2013 | Brie et al. | | |
| 2005/0198860 A1 * | 9/2005 | Larson | ................ | A43B 3/16 |
| | | | | 36/7.6 |
| 2010/0058615 A1 * | 3/2010 | Couder | ............. | A43C 15/02 |
| | | | | 36/62 |
| 2010/0139118 A1 * | 6/2010 | Park | ................... | A43B 5/001 |
| | | | | 36/7.6 |
| 2011/0099847 A1 * | 5/2011 | Koe-Krompecher | .... | A43B 5/00 |
| | | | | 36/127 |
| 2015/0332614 A1 | 11/2015 | Rester | | |

FOREIGN PATENT DOCUMENTS

| | | |
|---|---|---|
| DE | 202014100294 U1 * | 6/2015 |
| DE | 202014100294 U1 | 6/2015 |

* cited by examiner

STEP-ON SHOE COVER AND METHOD OF USE THEREOF

CROSS-REFERENCE TO RELATED APPLICATIONS

This application claims benefit of priority application, U.S. Provisional Ser. No. 62/481,646 filed on Apr. 4, 2017 entitled "Simple Snap On Shoe Cover", which is incorporated herein by reference in its entirety.

FIELD OF THE INVENTION

The present disclosure is directed to covers for the bottom of shoes, also known as show covers. More specifically, the present disclosure is directed toward a step-on shoe cover with bistable spring bands to form to the shape of one's foot in a quick and safe manner.

BACKGROUND

Shoe covers are a common accessory used in various industries for protecting the environment from the bottom of the shoe and/or for protecting the shoe from the environment. For example, shoe covers may be commonly used in residential construction to protect floors of all sort. As another example, shoe covers may be protective coverings for shoes worn by surgical personnel working in a sterile environment in order to minimize contamination. As such, shoe covers are extremely useful in a wide array of environments and industries.

Shoe covers serve as great protection but have never been designed as user friendly. The instant disclosure recognizes the problem or difficulty of putting on shoe covers. Shoe covers are typically cloth type material that are put on over a shoe and secured with either elastic bands or strings. This either requires the user to find a place to sit down, which may be difficult based on the environment, or requires the user to balance on one foot and apply the shoe cover while standing on one leg. Accordingly, the instant disclosure recognizes that prior designs of shoe covers are not very use friendly or convenient.

The instant disclosure of a step-on shoe cover and method of use thereof may be designed to address at least certain aspects of the problems discussed above.

SUMMARY

Accordingly, in one aspect, the present invention embraces a step-on shoe cover. The step-on shoe cover of the instant disclosure may generally include a bottom layer and at least one bistable spring band. The bottom layer may be sized to cover at least a bottom of a shoe. The at least one bistable spring band may be attached to the bottom layer. The at least one bistable spring band may have a stable planar position and a bias coiling position. The stable planar position may be configured to hold the bottom layer flat. The bias coiling position may be configured to wrap the bottom layer around at least the bottom of the shoe. When the at least one bistable spring band is in the stable planar position, the shoe cover may be configured to lay flat on a surface. And, when the shoe cover lays flat on a surface and the bottom of the shoe is pressed down on the shoe cover, the bistable spring band may be configured to move to the bias coiling position thereby wrapping the bottom layer around at least the bottom of the shoe and securing the shoe cover on the bottom of the shoe. Finally, when the bistable spring band is in the bias coiling position where the bottom layer is wrapped around at least the bottom of the shoe and the shoe cover is secured on the bottom of the shoe, the bistable spring band may be configured to be unrolled and straightened out into the stable planar position thereby unwrapping the bottom layer from at least the bottom of the shoe.

In select embodiments of the step-on shoe cover, the at least one bistable spring band may include a length bistable spring band. The length bistable spring band may be configured to extend a length of the bottom layer. In this embodiment, the length of the bottom layer and the length bistable spring band may be sized to extend from beyond a heel end of the bottom of the shoe to beyond a toe end of the bottom of the shoe. Wherein, when the length bistable spring band is in the stable planar position, the shoe cover may be configured to lay flat on a surface. And, when the shoe cover lays flat on a surface and the bottom of the shoe is pressed down on the shoe cover, the length bistable spring band may be configured to move to the bias coiling position thereby wrapping the bottom layer around at least the bottom of the shoe from beyond the heel end to beyond the toe end thereby securing the bottom layer on the bottom of the shoe.

In other select embodiments of the step-on shoe cover, the at least one bistable spring band may include at least one width bistable spring band. The at least one width bistable spring band may be configured to extend a width of the bottom layer. In this embodiment, the width of the bottom layer and the at least one width bistable spring band may be sized to extend from beyond an inner side of the bottom of the shoe to beyond an outer side of the bottom of the shoe. Wherein, when the at least one width bistable spring band is in the stable planar position, the shoe cover may be configured to lay flat on a surface. And, when the shoe cover lays flat on a surface and the bottom of the shoe is pressed down on the shoe cover, the at least one width bistable spring band may be configured to move to the bias coiling position thereby wrapping the bottom layer around at least the bottom of the shoe from beyond the inner side to beyond the outer side thereby securing the bottom layer on the bottom of the shoe.

In select embodiments of the step-on shoe cover, the at least one width bistable spring band may include a ball width bistable spring band and a heel width bistable spring band. The ball width bistable spring band may be configured to extend a ball width of the bottom layer. The heel width bistable spring band may be configured to extend a heel width of the bottom layer. The ball width of the bottom layer and the ball width bistable spring band may be sized to extend from beyond an inner ball edge of the bottom of the shoe to beyond an outer ball edge of the bottom of the shoe. The heel width of the bottom layer and the heel width bistable spring band may be sized to extend from beyond an inner heel edge of the bottom of the shoe to beyond an outer heel edge of the bottom of the shoe. Wherein, when the ball width bistable spring band and the heel width bistable spring band are in the stable planar position, the shoe cover may be configured to lay flat on a surface. And, when the shoe cover lays flat on a surface and the bottom of the shoe is pressed down on the shoe cover, the ball width bistable spring band and the heel width bistable spring band may be configured to move to the bias coiling position thereby wrapping the bottom layer around at least the bottom of the shoe from beyond the inner ball edge to beyond the outer ball edge, and from beyond the inner heel edge to beyond the outer heel edge, thereby securing the bottom layer on the bottom of the shoe.

In other select embodiments of the step-on shoe cover, the at least one bistable spring band may include a length bistable spring band, a ball width bistable spring band, and a heel width bistable spring band. The length bistable spring band may be configured to extend a length of the bottom layer. This length of the bottom layer and the length bistable spring band may be sized to extend from beyond a heel end of the bottom of the shoe to beyond a toe end of the bottom of the shoe. The ball width bistable spring band may be configured to extend a ball width of the bottom layer. This ball width of the bottom layer and the ball width bistable spring band may be sized to extend from beyond an inner ball edge of the bottom of the shoe to beyond an outer ball edge of the bottom of the shoe. The heel width bistable spring band configured to extend a heel width of the bottom layer. This heel width of the bottom layer and the heel width bistable spring band being sized to extend from beyond an inner heel edge of the bottom of the shoe to beyond an outer heel edge of the bottom of the shoe. Wherein, when the length bistable spring band, the ball width bistable spring band, and the heel width bistable spring band are in the stable planar position, the shoe cover may be configured to lay flat on a surface. When laid flat, the shoe cover may extend from a first end of the length bistable spring band approximate the toe end to ends of the ball width bistable spring band, from the ends of the ball width bistable spring band, to ends of the heel width bistable spring band, and from the ends of the heel width bistable spring band to a second end of the length bistable spring band approximate the heel end to create a substantial hexagon shape. In select embodiments, this substantial hexagonal shape may have rounded corners. And, when the shoe cover lays flat on a surface and the bottom of the shoe is pressed down on the shoe cover, the length bistable spring band, the ball width bistable spring band, and the heel width bistable spring band may be configured to move to the bias coiling position thereby wrapping the bottom layer around at least the bottom of the shoe from beyond the heel end to beyond the toe end, beyond the inner ball edge to beyond the outer ball edge, and from beyond the inner heel edge to beyond the outer heel edge, thereby securing the bottom layer on the bottom of the shoe.

Another feature of the instant step-on shoe covers is that each of the at least one bistable spring bands may include cap covers on each end. The cap covers may be configured to suspend their respective bistable spring bands above a surface when flat on a surface. In select embodiments, the cap covers may suspend their respective bistable spring bands a set distance above the surface configured for allowing the bistable spring bands to move from the stable planar position to the bias coiling position. In select embodiments, the set distance that the cap covers suspend their respective bistable spring bands may be from 0.01 inches to 1.00 inches. In other possible preferred select embodiments, the set distance that the cap covers suspend their respective bistable spring bands may be from 0.25 inches to 0.50 inches. In select other possibly most preferred embodiments, the set distance that the cap covers suspend their respective bistable spring bands may be approximately or equal to 0.38 inches. In other select embodiments, the cap covers may include rounded outer shapes configured for protecting the shoe cover from ends of the bistable spring bands.

In select embodiments of the instant step-on shoe covers, each of the at least one bistable spring bands may be steel bands pressed into an arch configured for making the bistable spring bands configured to have the stable planar position and the bias coiling position. Each bistable spring band may have a thickness. In select embodiments, the length of each bistable spring band may be from 2.0 inches to 25.0 inches. In select possibly preferred embodiments, the length of each bistable spring band may be from 5.0 inches to 20.0 inches. In select possibly preferred embodiments, the length of each bistable spring band may be from 8.0 inches to 17.0 inches. In select embodiments, the width of each bistable spring band may be from 0.10 inches to 2.50 inches. In select possibly preferred embodiments, the width of each bistable spring band may be from 0.15 inches to 2.0 inches. In select possibly preferred embodiments, the width of each bistable spring band may be approximately 1.0 inches. In select embodiments, the thickness of each bistable spring band may be from 0.001 inches to 0.200 inches. In other select possibly preferred embodiments, the thickness of each bistable spring band may be from 0.003 inches to 0.009 inches. In other select possibly most preferred embodiments, the thickness of each bistable spring band may be approximately or equal to 0.008 inches. Each bistable spring band may also have an arch for creating the bistable positions. In select embodiments, the arch of each bistable spring band may have a bending angle from 1 degree to 180 degrees. In other select possibly preferred embodiments, the arch of each bistable spring band may have a bending angle from 45 degrees to 135 degrees. In other select possibly most preferred embodiments, the arch of each bistable spring band may have a bending angle of approximately or equal to 90 degrees. As an example, in select embodiments, the steel bands may be high yield temper 301 stainless steel bands with a thickness of 0.008 inches, pressed into an arch with a bending angle of approximately or equal to 90 degrees.

Another feature of the instant step-on shoe cover may be that the bottom layer may include a bottom surface configured for walking.

Another feature of the instant step-on shoe cover may be the inclusion of a top layer. The top layer may be sized to match the bottom layer. In select embodiments, the top layer may be attached to the bottom layer with the at least one bistable spring band positioned therebetween. In select embodiments, the top layer may include a top surface configured for grip and/or comfort. In select embodiments, the top layer and the bottom layer may be sewn together via a pattern including pockets for each of the at least one bistable spring bands.

Another feature of the instant step-on shoe cover may be the inclusion of an elastic member. The elastic member may be positioned between the at least one bistable spring band and the top layer around the shoe cover in a channel approximate a perimeter created by the sewn pattern. Wherein, when the at least one bistable spring band is in the stable planar position, the elastic member may be configured to stretch to allow the shoe cover to lay substantially flat on a surface. When the shoe cover lays flat on the surface and the bottom of the shoe is pressed down on the shoe cover and the at least one bistable spring band moves to the bias coiling position, the elastic member may be configured to constrict to wrap the perimeter of the shoe cover around at least the bottom of the shoe thereby securing the shoe cover on the bottom of the shoe. And, when the at least one bistable spring band is in the bias coiling position where the bottom layer is wrapped around at least the bottom of the shoe and the shoe cover is secured on the bottom of the shoe, the elastic member may be configured to stretch to allow the at least one bistable spring band to be unrolled and straightened out into the stable planar position thereby unwrapping the bottom layer from at least the bottom of the shoe.

In another aspect, the instant disclosure embraces a method of covering a bottom of a shoe. The instant method of covering the bottom of a shoe may generally include the step of providing the instant step-on shoe cover in any of the various embodiments shown and/or described herein. As such, the step-on shoe cover may be provided with at least the bottom layer sized to cover at least a bottom of a shoe, and at least one bistable spring band attached to said bottom layer, where the at least one bistable spring band has a stable planar position and a bias coiling position. As such, the stable planar position may be configured to hold the bottom layer flat, and the bias coiling position may be configured to wrap the bottom layer around at least the bottom of the shoe. As a result, the instant method of covering the bottom of a shoe may also include the steps of: positioning the shoe cover flat on a surface with each of the at least one bistable spring bands in the stable planar position; and pressing on the shoe cover with a bottom of a shoe causing each of the at least one bistable spring bands to move to the bias coiling position thereby wrapping the bottom layer around at least the bottom of the shoe and securing the shoe cover on the bottom of the shoe.

In select embodiments of the instant method of covering the bottom of a shoe, the method may further include the step of unrolling and straightening out each of the at least one bistable spring bands into the stable planar position thereby unwrapping the bottom layer from at least the bottom of the shoe.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

Figure 1:
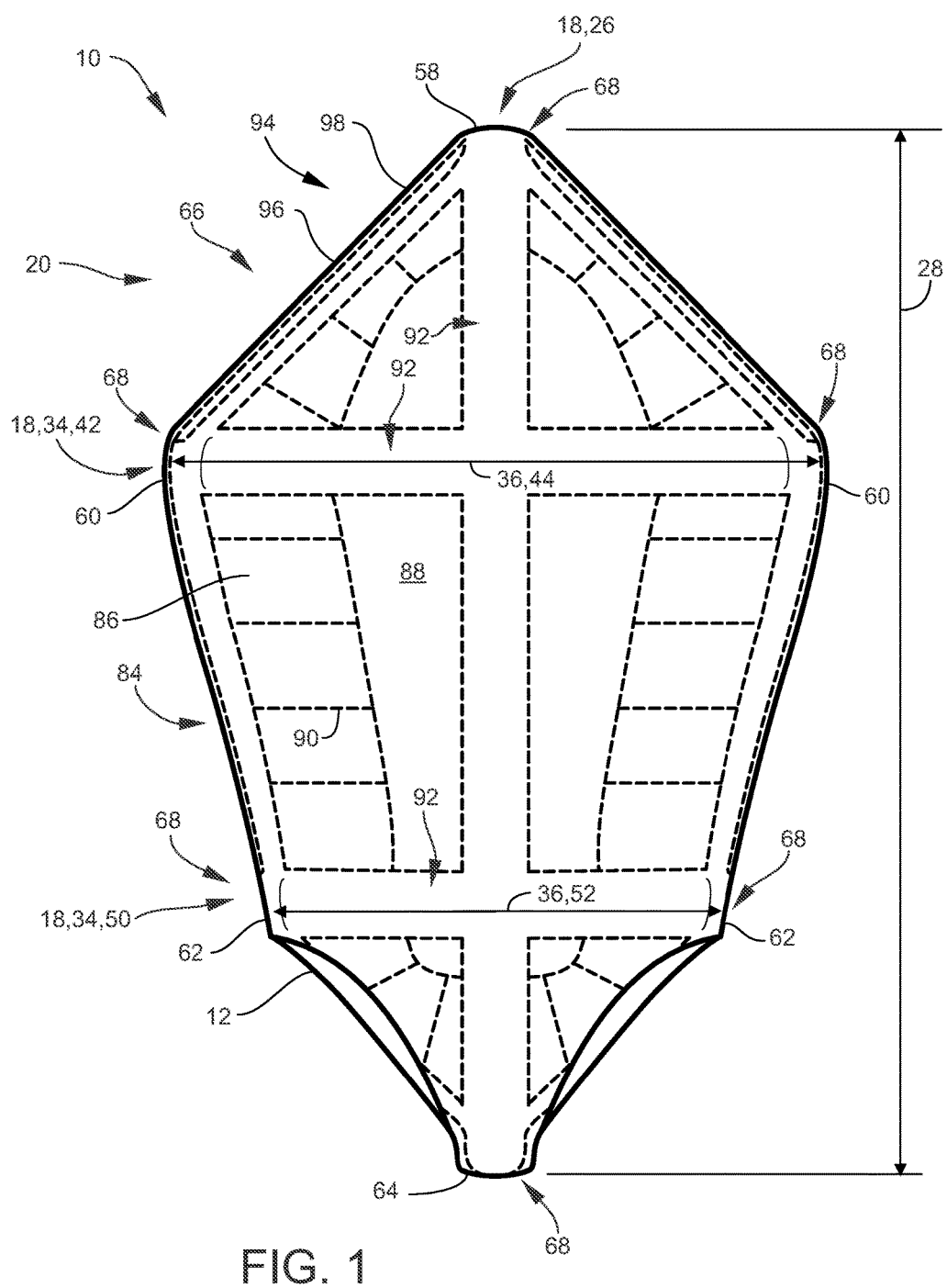
FIG. 1 is a top view of the step-on shoe cover according to select embodiments of the instant disclosure in the stable planar position.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-7, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-6, in a possibly preferred embodiment, the present disclosure overcomes the above-mentioned disadvantages and meets the recognized need for such an apparatus or method by providing of step-on shoe cover 10. Step-on shoe cover 10 may be a shoe cover design or creation that allows you to put a cover on the bottom of one's shoes (or just the bottom of one's feet) without hands. Step-on shoe cover 10 may be applied or secured to the bottom of one's feet or shoes with a simple step onto the device or cover. As such, with the use of bistable spring bands 18 incorporated therein, step-on shoe cover 10 can differ from typical shoe covers by wrapping around a shoe or foot in a simple, easy to perform step-on motion. Step-on shoe cover 10 may generally include bottom layer 12 and at least one bistable spring band 18. These parts and their use will be described in more detail below.

Bottom layer 12 may be included with step-on shoe cover 10. See FIGS. 1, 2, 3A, 3B, 3C and 4. Bottom layer 12 may be for providing a flexible surface or material that is configured to lay flat and then flexibly move to wrap around bottom 14 of shoe 16. As such, bottom layer 12 may be sized to cover at least bottom 14 of shoe 16. Although the instant disclosure may be illustrated and mainly directed to a shoe cover for covering at least bottom 14 of shoe 16, the disclosure is not so limited, and step-on shoe cover 10 may also be used to cover the bottom of one's bare feet, or even other similar shoe type devices or feet coverings like socks. Bottom layer 12 may be sized slightly larger than bottom 14 of shoe 16 to provide enough room to secure bottom layer 12 onto bottom 14 of shoe 16. As the size of shoes may vary, so may the size of bottom layer 12 and step-on shoe cover 10. Bottom layer 12 may be any desired flexible material configured to cover bottom 14 of shoe 16, including, but not limited to, any non-woven or woven fabrics, rubbers, soles, felts, plastics, the like, etc., including, but not limited to, weatherproof materials, like water proof/resistant materials, materials for the outdoor elements, like snow, ice, rain, mud, dirt, etc. Bottom layer 12 may include bottom surface 84 on the bottom of step-on shoe cover 10. As such, step-on shoe cover 10 may be designed for many different use and environments by the different materials on bottom surface 84 of bottom layer 12. In select embodiments, bottom surface 84 may be configured for walking. Bottom surface 84 may be any desired surface configured for walking. Top layer 86 may be included with step-on shoe cover 10. Top layer 86 may be sized to match bottom layer 12. See FIG. 4. In select embodiments, top layer 86 may be attached to bottom layer 12 with the at least one bistable spring band 18 positioned therebetween. In select embodiments, top layer 86 may include top surface 88. Top surface 88 of top layer 86 may be configured for grip and/or comfort. As such, top surface 88 of top layer 86 may be made from any desired material for grip and/or comfort. In select embodiments, as shown in the Figures, top layer 86 and bottom layer 12 may be sewn together via pattern 90. Pattern 90 may attach top layer 86 and bottom layer 12. Pattern 90 may include pockets 92 for each of the at least one bistable spring bands 18.

Figures 3A, 3B:
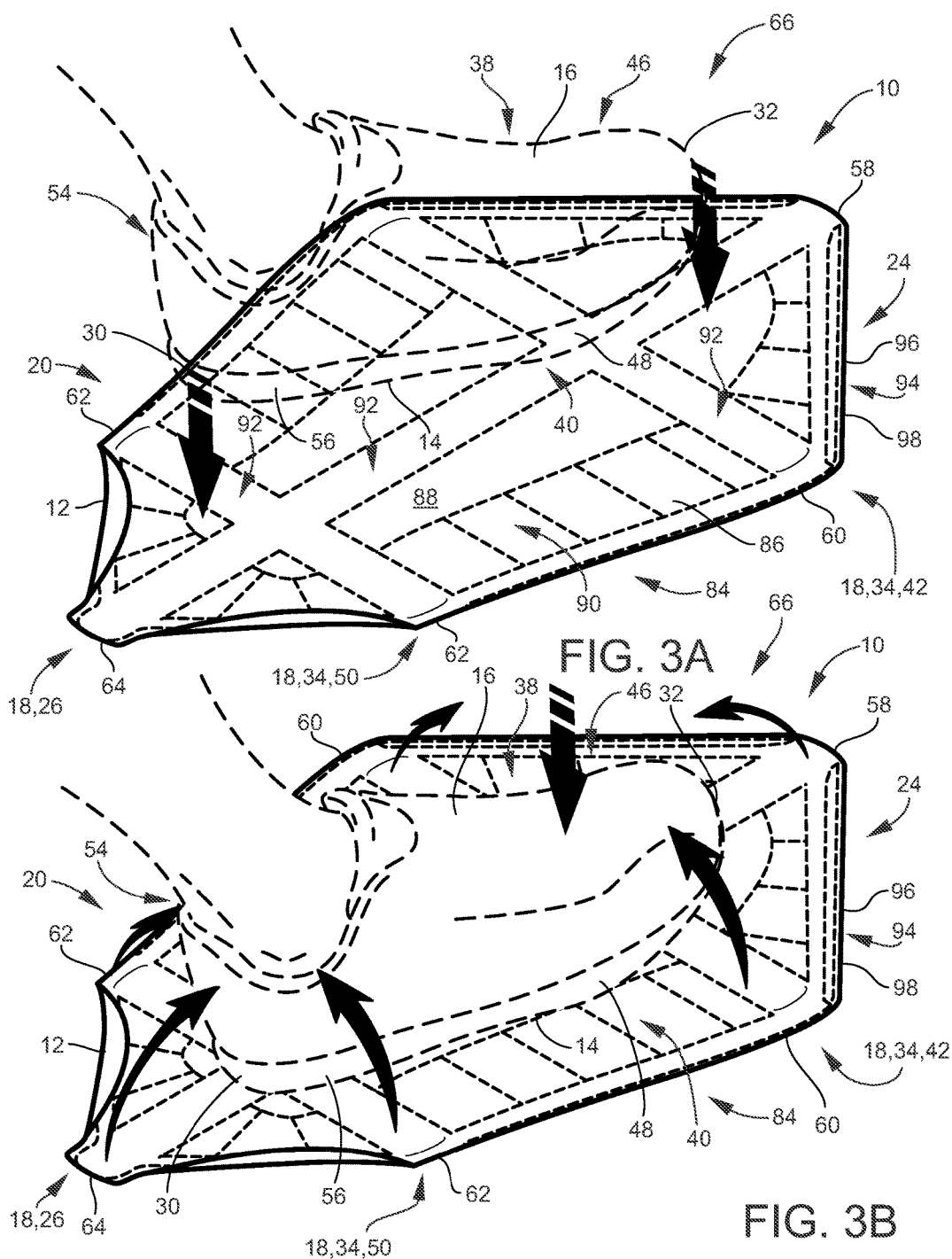
FIG. 3A is a top perspective view of the step-on shoe cover from FIG. 1 in the stable planar position with the bottom of a shoe being positioned above the top layer.
FIG. 3B is a top perspective view of the step-on shoe cover from FIG. 1 in the stable planar position with the bottom of the shoe starting to press down on the bistable spring bands.
Figure 3C:
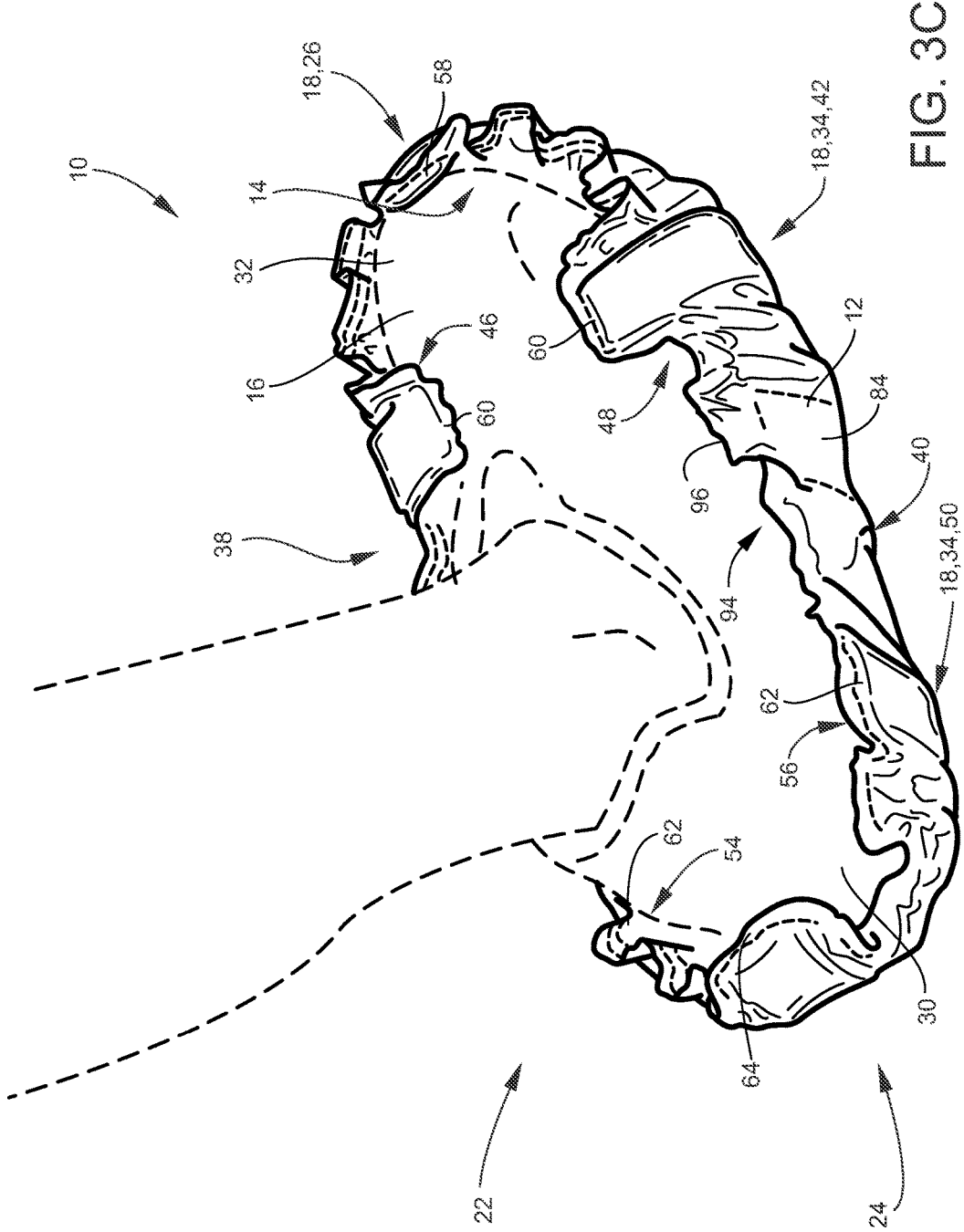
FIG. 3C is a top perspective view of the step-on shoe cover from FIG. 1 in the bias coiling position with the step-on shoe cover wrapped and secured around the bottom of the shoe.
Figure 4:
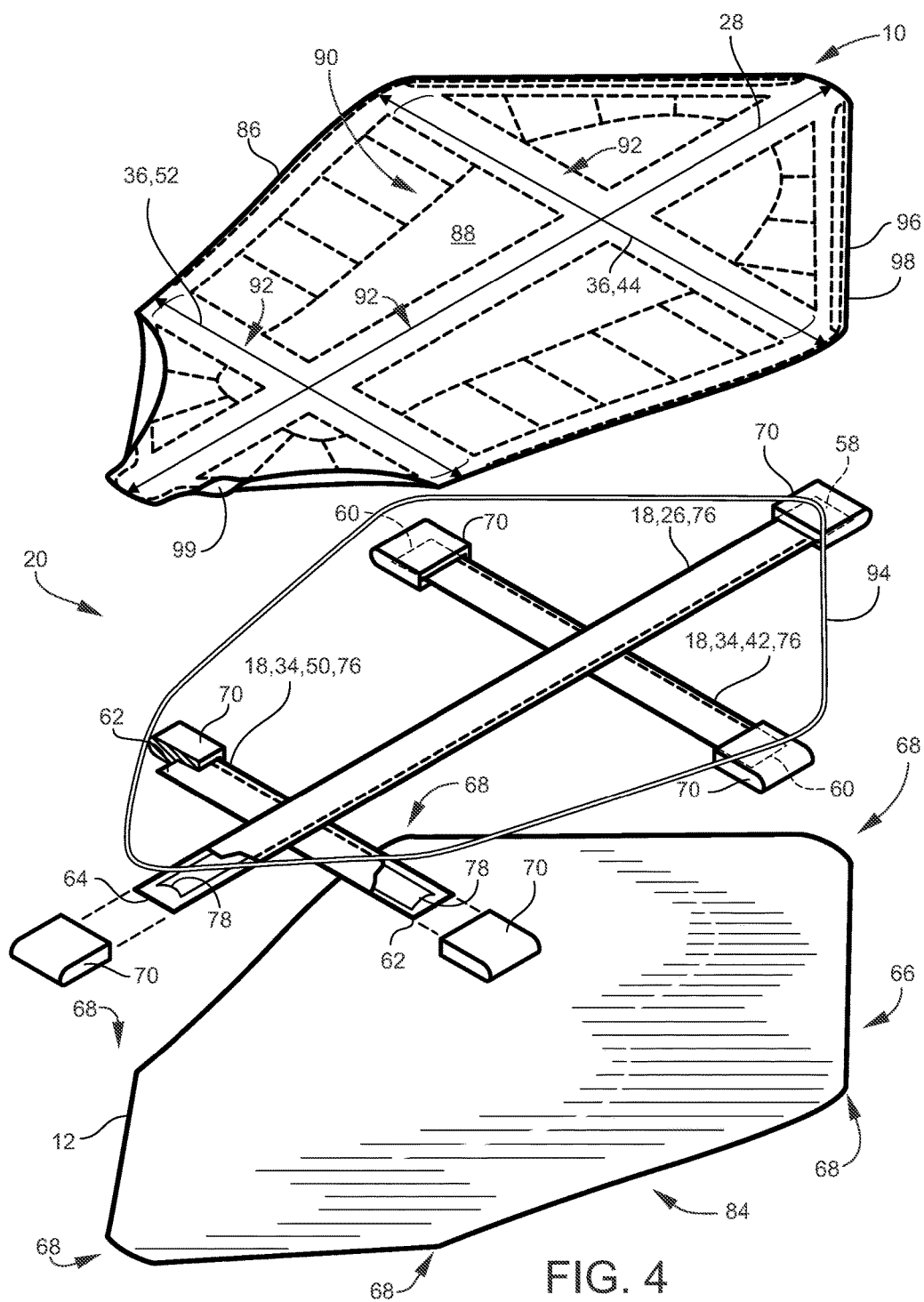
FIG. 4 is a top disassembled perspective view of the step-on shoe cover from FIG. 1.
Figure 5:
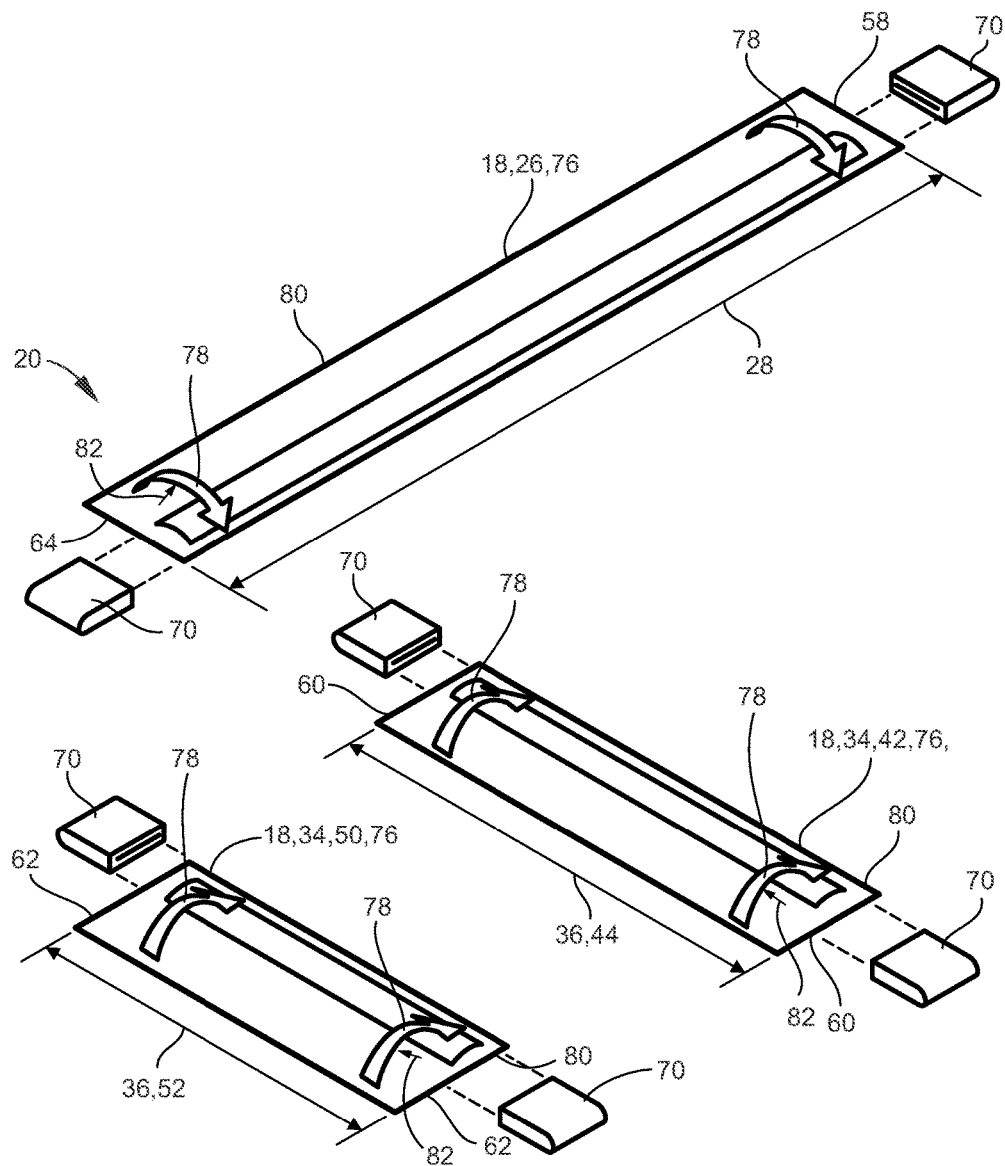
FIG. 5 is a perspective view of the bistable spring bands according to select embodiments of the instant disclosure.
Figure 6:
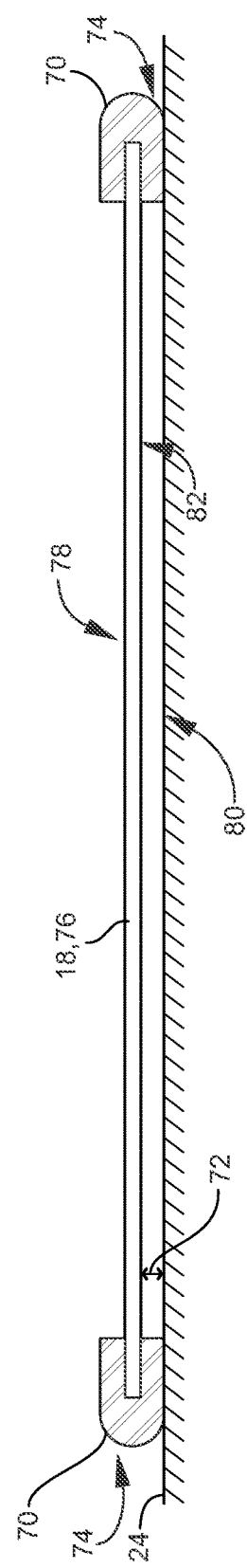
FIG. 6 is a side plan view of one of the bistable spring bands according to select embodiments of the instant disclosure.

At least one bistable spring band 18 may be included with step-on shoe cover 10. See FIGS. 1, 2, 3A, 3B, 3C, 4, 5 and 6. The at least one bistable spring band 18 may be for holding bottom layer 12 in a flat position, and for wrapping bottom layer 12 around bottom 14 of shoe 16 when pressed or stepped on. The at least one bistable spring band 18 may be any device, mechanism, machine, material, or the like, configured for holding bottom layer 12 in a flat position, and for wrapping bottom layer 12 around bottom 14 of shoe 16 when pressed or stepped on. The at least one bistable spring band 18 may be attached to or included in bottom layer 12. The at least one bistable spring band 18 may be attached to bottom layer 12 by any means, including but not limited to, by securing the at least one bistable spring band 18 between bottom layer 12 and top layer 86, as shown in the Figures. The at least one bistable spring band 18 may have stable planar position 20 (see FIGS. 1, 3A, 3B, 4, 5, and 6) and bias coiling position 22 (see FIGS. 2 and 3C). Stable planar position 20 may be configured to hold bottom layer 12 flat, as shown in FIGS. 1, 3A, 3B and 6. Bias coiling position 22 may be configured to wrap bottom layer 12 around at least bottom 14 of shoe 16, as shown in FIG. 4. When the at least one bistable spring band 18 is in stable planar position 20, step-on shoe cover 10 may be configured to lay flat on surface 24 (see FIG. 3A). And, when step-on shoe cover 10 lays flat on surface 24 and bottom 14 of shoe 16 is pressed down on the shoe cover, i.e. stepped on (see FIG. 3B), the at least one bistable spring band 18 may be configured to move to bias coiling position 22 thereby wrapping bottom layer 12 around at least bottom 14 of shoe 16 and securing step-on shoe cover 10 on bottom 14 of shoe 16 (see FIG. 3C). Finally, when the at least one bistable spring band 18 is moved to bias coiling position 22, where bottom layer 12 is wrapped around at least bottom 14 of shoe 16 and step-on shoe cover 10 is secured on bottom 14 of shoe 16, the at least one bistable spring band 18 may be configured to be unrolled and straightened out into stable planar position 20 thereby unwrapping bottom layer 12 from at least bottom 14 of shoe 16. The at least one bistable spring band 18 may include any various configurations and quantities of bistable spring bands 18. In select embodiments of the instant step-on shoe covers 10, each of the at least one bistable spring bands 18 may be steel bands pressed into an arch configured for making the bistable spring bands configured to have stable planar position 20 and bias coiling position 22. Each bistable spring band 18 may have thickness 80. In select embodiments, the length of each bistable spring band 18 may be from 2.0 inches to 25.0 inches. In select possibly preferred embodiments, the length of each bistable spring band 18 may be from 5.0 inches to 20.0 inches. In select possibly preferred embodiments, the length of each bistable spring band 18 may be from 8.0 inches to 17.0 inches. In select embodiments, the width of each bistable spring band 18 may be from 0.10 inches to 2.50 inches. In select possibly preferred embodiments, the width of each bistable spring band 18 may be from 0.15 inches to 2.0 inches. In select possibly preferred embodiments, the width of each bistable spring band 18 may be approximately 1.0 inches.

In select embodiments of step-on shoe cover 10, the at least one bistable spring band 18 may include length bistable spring band 26. See FIGS. 1, 2, 3A, 3B, 3C, 4, and 5. Although the Figures show a single length bistable spring band 26, the disclosure is not so limited, and zero or multiple length bistable spring bands 26 may be included in step-on shoe cover 10. Length bistable spring band 26 may be configured to extend length 28 of bottom layer 12. In this embodiment, length 28 of bottom layer 12 and length bistable spring 26 band may be sized to extend from beyond heel end 30 of bottom 14 of shoe 16 to beyond toe end 32 of bottom 14 of shoe 16. Wherein, when length bistable spring band 26 is in stable planar position 20, step-on shoe cover 10 may be configured to lay flat on surface 24. And, when step-on shoe cover 10 lays flat on surface 24 and bottom 14 of shoe 16 is pressed down on, or stepped on shoe cover 10, length bistable spring band 26 may be configured to move to bias coiling position 22 thereby wrapping bottom layer 12 around at least bottom 14 of shoe 16 from beyond heel end 30 to beyond toe end 32 thereby securing bottom layer 12 on bottom 14 of shoe 16. In select embodiments, length bistable spring band 26 may have a length from 5.0 inches to 30.0 inches. In select possibly preferred embodiments, length bistable spring band 26 may have a length from 10.0 inches to 25.0 inches. In select possibly most preferred embodiments, length bistable spring band 26 may have a length of approximately 17.0 inches.

In other select embodiments of step-on shoe cover 10, the at least one bistable spring band 18 may include at least one width bistable spring band 34. See FIGS. 1, 2, 3A, 3B, 3C, 4, and 5. Although the Figures show two width bistable spring bands 34, the disclosure is not so limited, and zero, one, or more than two width bistable spring bands 34 may be included in step-on shoe cover 10. The width bistable spring bands 34 may be configured to extend width 36 of bottom layer 12. In this embodiment, width 36 of bottom layer 12 and the at least one width bistable spring band 34 may be sized to extend from beyond inner side 38 of bottom 14 of shoe 16 to beyond outer side 40 of bottom 14 of shoe 16. Wherein, when the at least one width bistable spring band 34 is in stable planar position 20, step-on shoe cover 10 may be configured to lay flat on surface 24. And, when step-on shoe cover 10 lays flat on surface 24 and bottom 14 of shoe 16 is pressed down on or stepped on shoe cover 10, the at least one width bistable spring band 34 may be configured to move to bias coiling position 22 thereby wrapping bottom layer 12 around at least bottom 14 of shoe 16 from beyond inner side 38 to beyond outer side 40 thereby securing bottom layer 12 on bottom 14 of shoe 16.

As shown in the Figures, in select embodiments of step-on shoe cover 10, the at least one width bistable spring band 34 may include ball width bistable spring band 42 and heel width bistable spring band 50. Ball width bistable spring band 42 may be configured to extend ball width 44 of bottom layer 12. Heel width bistable spring band 50 may be configured to extend heel width 52 of bottom layer 12. Ball width 44 of bottom layer 12 and ball width bistable spring band 42 may be sized to extend from beyond inner ball edge 46 of bottom 14 of shoe 16 to beyond outer ball edge 48 of bottom 14 of shoe 16. Heel width 52 of bottom layer 12 and heel width bistable spring band 50 may be sized to extend from beyond inner heel edge 54 of bottom 14 of shoe 16 to beyond outer heel edge 56 of bottom 14 of shoe 16. Wherein, when ball width bistable spring band 42 and heel width bistable spring band 50 are in stable planar position 20, step-on shoe cover 10 may be configured to lay flat on surface 24. And, when step-on shoe cover 10 lays flat on surface 24 and bottom 14 of shoe 16 is pressed down or stepped on shoe cover 10, ball width bistable spring band 42 and heel width bistable spring band 50 may be configured to move to bias coiling position 22 thereby wrapping bottom layer 12 around at least bottom 14 of shoe 16 from beyond inner ball edge 46 to beyond outer ball edge 48, and from beyond inner heel edge 54 to beyond outer heel edge 56, thereby securing bottom layer 12 on bottom 14 of shoe 16. In select embodiments, ball width bistable spring band 42 may have a length from 3.0 inches to 20.0 inches. In select possibly preferred embodiments, ball width bistable spring band 42 may have a length from 7.0 inches to 15.0 inches. In select possibly most preferred embodiments, ball width bistable spring band 42 may have a length of approximately 11.5 inches. In select embodiments, heel width bistable spring band 50 may have a length from 2.0 inches to 18.0 inches. In select possibly preferred embodiments, heel width bistable spring band 50 may have a length from 4.0 inches to 12.0 inches. In select possibly most preferred embodiments, heel width bistable spring band 50 may have a length of approximately 8.0 inches.

Referring now specifically to the configuration and embodiments shown in the Figures, in other select embodiments of step-on shoe cover 10, the at least one bistable spring band 18 may include length bistable spring band 26, ball width bistable spring band 42, and heel width bistable spring band 50. As described above, length bistable spring band 26 may be configured to extend length 28 of bottom layer 12. This length 28 of bottom layer 12 and length bistable spring band 26 may be sized to extend from beyond heel end 30 of bottom 14 of shoe 16 to beyond toe end 32 of bottom 14 of shoe 16. Ball width bistable spring band 42 may be configured to extend ball width 44 of bottom layer 12. This ball width 44 of bottom layer 12 and ball width bistable spring band 42 may be sized to extend from beyond inner ball edge 46 of bottom 14 of shoe 16 to beyond outer ball edge 48 of bottom 14 of shoe 16. Heel width bistable spring band 50 may be configured to extend heel width 52 of bottom layer 12. This heel width 52 of bottom layer 12 and heel width bistable spring band 50 may be sized to extend from beyond inner heel edge 54 of bottom 14 of shoe 16 to beyond outer heel edge 56 of bottom 14 of shoe 16. Wherein, when length bistable spring band 26, ball width bistable spring band 42, and heel width bistable spring band 50 are in stable planar position 20 (see FIGS. 1, 3A, 3B, 4, and 5), step-on shoe cover 10 may be configured to lay flat on surface 24. When laid flat, step-on shoe cover 10 may extend from first end 58 of length bistable spring band 26 approximate toe end 32 to ends 60 of ball width bistable spring band 42, from ends 60 of ball width bistable spring band 42 to ends 62 of heel width bistable spring band 50, and from ends 62 of heel width bistable spring band 50 to second end 64 of length bistable spring band 26 approximate heel end 30 to create substantial hexagon shape 66 of step-on shoe cover 10, including bottom layer 12 and top layer 86, as shown in FIGS. 1, 3A, 3B, and 4. In select embodiments, this substantial hexagonal shape 66 may have rounded corners 68, as shown in the Figures. And, when step-on shoe cover 10 lays flat on surface 24 and bottom 14 of shoe 16 is pressed down or stepped on shoe cover 10, length bistable spring band 26, ball width bistable spring band 42, and heel width bistable spring band 50 may be configured to move to bias coiling position 22 thereby wrapping bottom layer 12 around at least bottom 14 of shoe 16 from beyond heel end 30 to beyond toe end 32, beyond inner ball edge 46 to beyond outer ball edge 48, and from beyond inner heel edge 54 to beyond outer heel edge 56, thereby securing bottom layer 12 on bottom 14 of shoe 16. As examples, and clearly not limited thereto, length bistable spring band 26 may have a length of 17.0 inches and a width of 1.0 inches, ball width bistable spring band 42 may have a length of 11.5 inches and a width of 1.0 inches, and heel width bistable spring band 50 may have a length of 8.0 inches and a width of 1.0 inches. However, the disclosure is clearly not limited thereto, and other various combinations of sizes for the bistable spring bands 18 and step-on shoe cover 10 may be desired, like for bigger or smaller size shoes, various desired uses, soles, etc.

Another feature of the instant step-on shoe cover 10 may be that each of the at least one bistable spring bands 18 may include cap covers 70 on each end. See FIGS. 4, 5 and 6. Cap covers 70 may be for suspending their respective bistable spring band 18 in the air and/or for covering the sharp corners or edges of their respective bistable spring band 18. Cap covers 70 may be any device, devices, materials, mechanisms or machines configured to suspend their respective bistable spring band 18 in the air and/or configured for covering the sharp corners or edges of their respective bistable spring band 18. As such, cap covers 70 may be configured to suspend their respective bistable spring bands 18 above surface 24 when flat on surface 24. In select embodiments, cap covers 70 may suspend their respective bistable spring bands 18 set distance 72 above surface 24. See FIG. 6. Set distance 72 may be configured for allowing bistable spring bands 18 to move from stable planar position 20 to bias coiling position 22, as bistable spring bands 18 may need to deform to move from stable planar position 20 to bias coiling position 22. In select embodiments, set distance 72 that cap covers 70 suspend their respective bistable spring bands 18 off surface 24 may be from 0.01 inches to 1.00 inches. In other possible preferred select embodiments, set distance 72 that cap covers 70 suspend their respective bistable spring bands 18 off of surface 24 may be from 0.25 inches to 0.50 inches. In select other possibly most preferred embodiments, set distance 72 that cap covers 70 suspend their respective bistable spring bands 18 off of surface 24 may be approximately or equal to 0.38 inches. In other select embodiments, cap covers 70 may include rounded outer shapes 74, as shown in the Figures. Rounded outer shapes 74 may be configured for protecting step-on shoe cover 10 from ends, edges, and/or corners of bistable spring bands 18, including protection for bottom layer 12 and/or top layer 86. Cap covers 70 may have any desired size. In select embodiments, cap coves may be approximately 1.02 inches wide, and approximately 1.25 inches long. As shown in FIG. 4, in select embodiments, bistable spring bands 18 may also include wraps or covers along their entire length configured for protecting step-on shoe cover 10 and bistable spring bands 18.

Each of the bistable spring bands 18, including, but not limited to, length bistable spring band 26, ball width bistable spring band 42, heel width bistable spring band 50, may be steel bands 76. Steel bands 76 may be pressed into arch 78 configured for making steel bands 76 into bistable spring bands 18 configured to have stable planar position 20 and bias coiling position 22. Each bistable spring band 18 may have thickness 80. In select embodiments, thickness 80 of each bistable spring band 18 may be from 0.001 inches to 0.200 inches. In other select possibly preferred embodiments, thickness 80 of each bistable spring band 18 may be from 0.003 inches to 0.009 inches. In other select possibly most preferred embodiments, thickness 80 of each bistable spring band 18 may be approximately or equal to 0.008 inches. Each bistable spring band may also have arch 78 for creating the bistable positions: stable planar position 20; and bias coiling position 22. Arch 78 of each bistable spring band 18 may have bending angle 82 configured for creating the desired bistable position. In select embodiments, arch 78 of each bistable spring band 18 may have bending angle 82 from 1 degree to 180 degrees. In other select possibly preferred embodiments, arch 78 of each bistable spring band 18 may have bending angle 82 from 45 degrees to 135 degrees. In other select possibly most preferred embodiments, arch 78 of each bistable spring band 18 may have bending angle 82 of approximately or equal to 90 degrees. As an example, and clearly not limited thereto, in select embodiments, each bistable spring band 18 may be made from steel bands 76 made from high yield temper 301 stainless steel bands with thickness 80 of 0.008 inches, pressed into arch 78 with bending angle 82 of 90 degrees.

Figure 2:
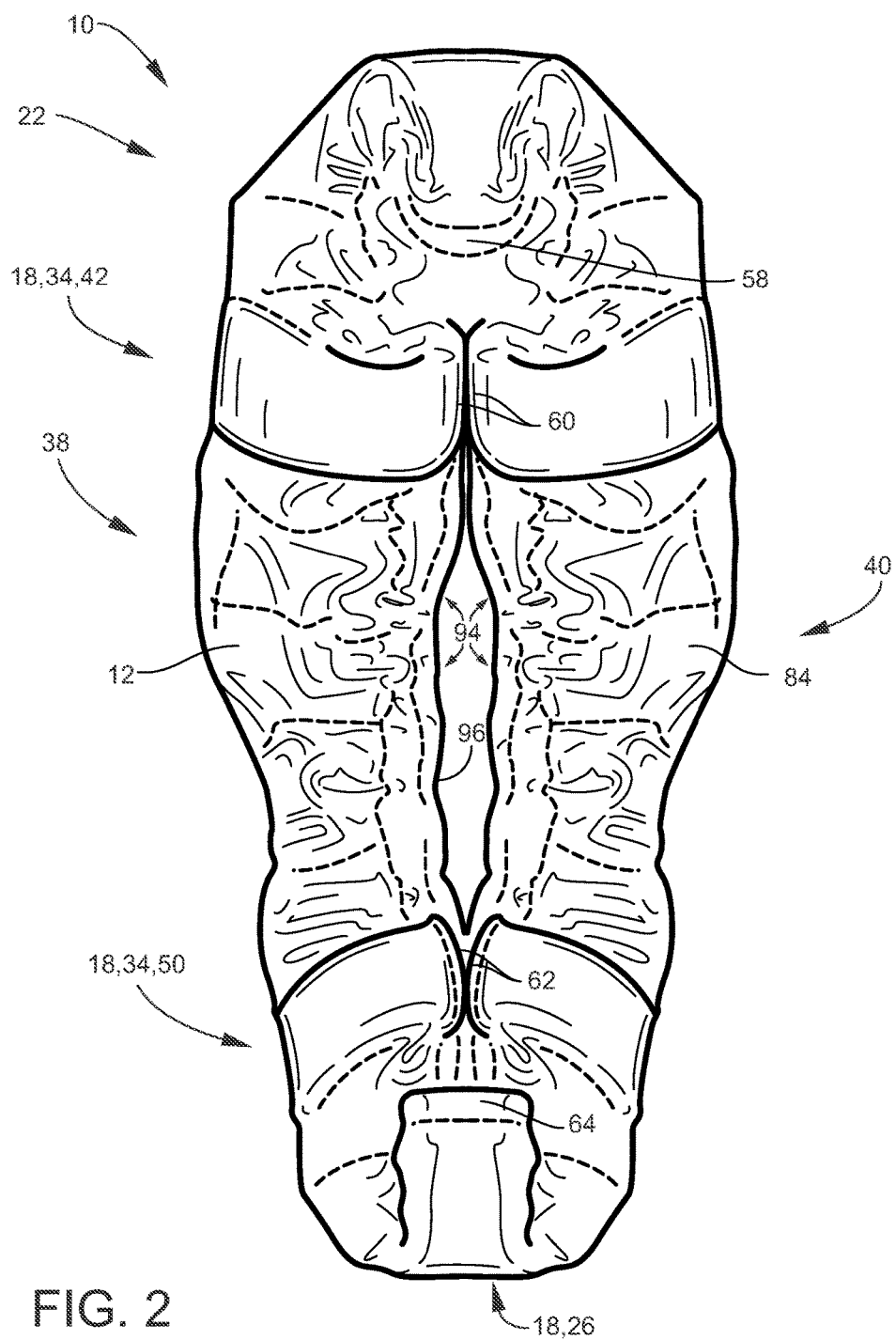
FIG. 2 is a top view of the step-on shoe cover from FIG. 1 in the bias coiling position.

Another feature of the instant step-on shoe cover may be the inclusion of elastic member 94. See FIGS. 1, 2, 3A, 3B, 3C and 4, best seen in FIG. 4. As shown in FIG.4, elastic member 94 may be positioned between the bistable spring bands 18 and top layer 86. Elastic member 94 may be around step-on shoe cover 10 in channel 96 approximate perimeter 98 created by the sewn pattern 90. Elastic member 94 may be configured to help keep tension around perimeter 98 or the edges of step-on shoe cover 10 when in the flat position or stable planar position 20 to hold its shape, as shown in FIGS. 1, 3A, 3B, 4, 5 and 6. Elastic member 94 may also be configured to help wrap perimeter 98 or the edges of step-on shoe cover 10 when in the bias coiling position 22, as shown in FIGS. 2 and 3C. Elastic member 94 may be any elastic member, device, material, machine, or combinations thereof, configured to help keep tension around perimeter 98 or the edges of step-on shoe cover 10 when in the flat position or stable planar position 20 to hold its shape, as shown in FIGS. 1, 3A, 3B, 4, 5 and 6, and/or to help wrap perimeter 98 or the edges of step-on shoe cover 10 when in the bias coiling position 22, as shown in FIGS. 2 and 3C. As shown in FIG. 4, an entrance hole 99 may be left in pattern 90 for inserting elastic member 94 into channel 96 around perimeter 98 of step-on shoe cover 10. Once elastic member 94 is inserted into channel 96 around perimeter 98, entrance hole 99 may be sewn up or closed. As examples, and clearly not limited thereto, elastic member 94 may be any cord, tape, or fabric, or the like, typically woven with strips of rubber, that returns to its original length or shape after being stretched. Wherein, when bistable spring bands 18 are in the stable planar position 20, elastic member 94 may be configured to stretch to allow step-on shoe cover 1—to lay substantially flat on surface 26. When step-on shoe cover 10 lays flat on surface 26 and bottom 14 of shoe 16 is pressed down on step-on shoe cover 10 and the bistable spring bands 18 move to bias coiling position 22, elastic member 94 may be configured to constrict to wrap perimeter 98 of step-on shoe cover 10 around at least bottom 14 of shoe 16 thereby securing step-on shoe cover 10 on bottom 14 of shoe 16. And, when the bistable spring bands 18 are in the bias coiling position 22 where bottom layer 12 is wrapped around at least bottom 14 of shoe 16 and step-on shoe cover 10 is secured on bottom 14 of shoe 16, elastic member 94 may be configured to stretch to allow the bistable spring bands 18 to be unrolled and straightened out into stable planar position 20 thereby unwrapping bottom layer 12 from at least bottom 14 of shoe 16.

Figure 7:
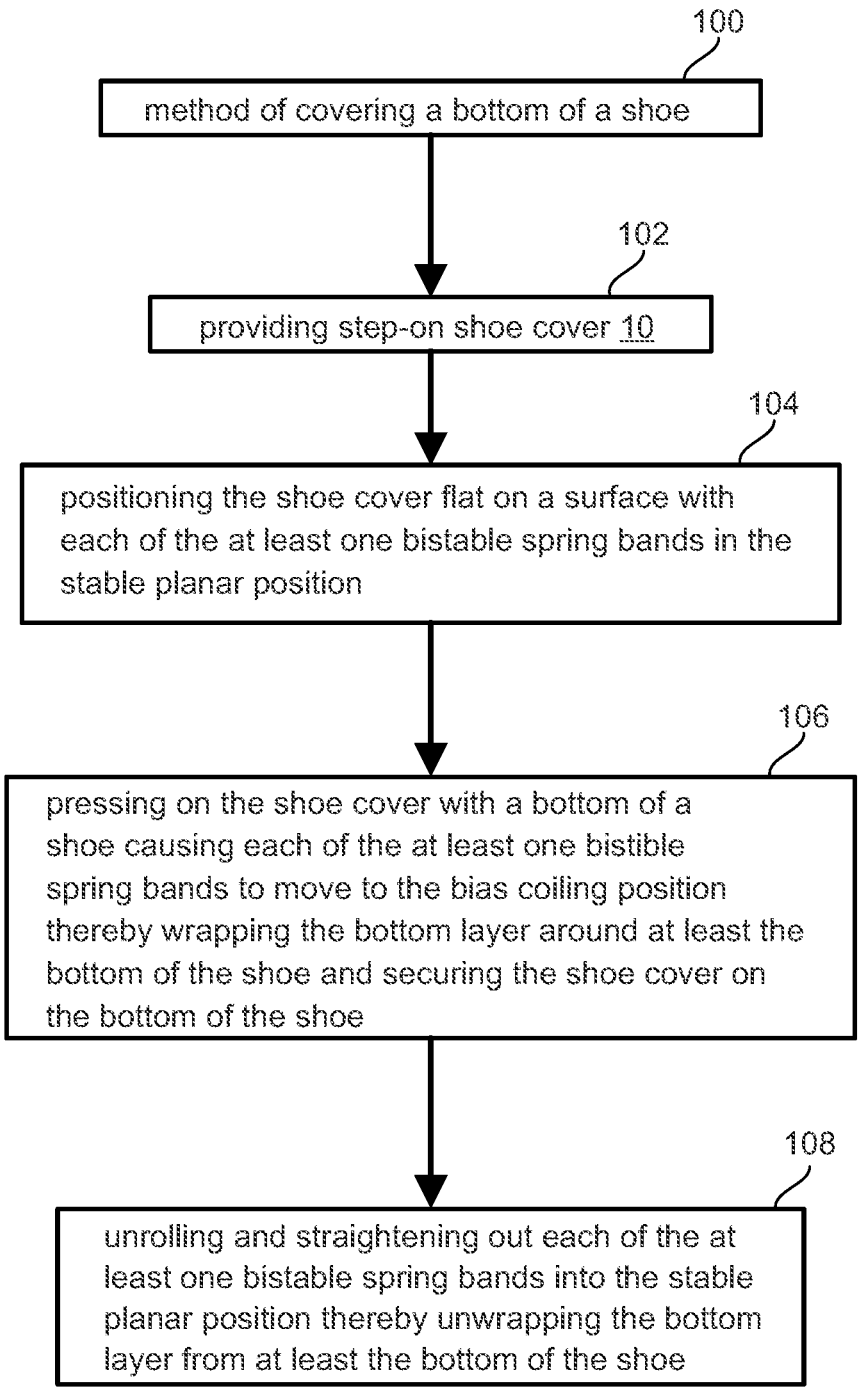
FIG. 7 is a flow diagram of the method of covering the bottom of the shoe according to select embodiments of the instant disclosure.

Referring now specifically to FIG. 7, in another aspect, the instant disclosure embraces method 100 of covering bottom 14 of shoe 16. Method 100 of covering bottom 14 of shoe 16 may generally include step 102 of providing step-on shoe cover 10 in any of the various embodiments shown and/or described herein. As such, the step-on shoe cover 10 may be provided with at least bottom layer 12 sized to cover at least bottom 14 of shoe 16, and at least one bistable spring band 18 attached to bottom layer 12, where the at least one bistable spring band 18 has stable planar position 20 and bias coiling position 22. As such, stable planar position 20 may be configured to hold bottom layer 12 flat, and bias coiling position 22 may be configured to wrap bottom layer 12 around at least bottom 14 of shoe 16. As a result, method 100 of covering bottom 14 of shoe 16 may also include the steps of: step 104 of positioning step-on shoe cover 10 flat on surface 24 with each of the at least one bistable spring bands 18 in stable planar position 20; and step 106 of pressing or stepping on shoe cover 10 with bottom 14 of shoe 16 causing each of the at least one bistable spring bands 18 to move to bias coiling position 22 thereby wrapping bottom layer 12 around at least bottom 14 of shoe 16 and securing step-on shoe cover 10 on bottom 14 of shoe 16.

In select embodiments of method 100 of covering bottom 14 of shoe 16, method 100 may further include step 108 of unrolling and straightening out each of the at least one bistable spring bands 18 into stable planar position 20 thereby unwrapping bottom layer 12 from at least bottom 14 of shoe 16.

In sum, the instant disclosure of step-on shoe cover 10 and method 100 of covering bottom 14 of shoe 16 with step-on shoe provides an easy accessible shoe cover with clean material to protect floors with the inclusion of bistable spring bands 18 to form to the shape of one's foot in a quickly and safe manner. With the bistable spring bands 18 placed in strategic positions and elevated slightly off the ground to snap around shoe 16 or foot, step-on shoe covers 10 will create a fast and safe alternative to original shoe covers that consist of slippery material and consist of a challenging process of balancing on one foot and wrapping your shoe. With the instant step-on shoe cover 10, the user will simply step onto shoe cover 10 which allow for simple hands-free installment onto one's shoe or foot. It may be as simple as stepping onto the cover and watching it snap around your shoe or foot without any hassle.

The present invention is not limited to where it can be used but is targeted towards residential construction.

\* \* \*

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A step-on shoe cover comprising:
   a bottom layer sized to cover at least a bottom of a shoe;
   at least one bistable spring band attached to said bottom layer;
   said at least one bistable spring band having a stable planar position and a bias coiling position:
      said stable planar position is configured to hold the bottom layer flat; and
      said bias coiling position is configured to wrap the bottom layer around at least the bottom of the shoe;
   wherein the at least one bistable spring band includes a length bistable spring band configured to extend a length of the bottom layer, the length of the bottom layer and the length bistable spring band being sized to extend from beyond a heel end of the bottom of the shoe to beyond a toe end of the bottom of the shoe.

2. The step-on shoe cover of claim 1, wherein:
   when the at least one bistable spring band is in the stable planar position, the shoe cover is configured to lay substantially flat on a surface;
   when the shoe cover lays flat on the surface and the bottom of the shoe is pressed down on the shoe cover, the at least one bistable spring band is configured to move to the bias coiling position thereby wrapping the bottom layer around at least the bottom of the shoe and securing the shoe cover on the bottom of the shoe; and
   when the at least one bistable spring band is in the bias coiling position where the bottom layer is wrapped around at least the bottom of the shoe and the shoe cover is secured on the bottom of the shoe, the at least one bistable spring band is configured to be unrolled and straightened out into the stable planar position thereby unwrapping the bottom layer from at least the bottom of the shoe.

3. The step-on shoe cover of claim 1, wherein:
   when the length bistable spring band is in the stable planar position, the shoe cover is configured to lay substantially flat on a surface; and
   when the shoe cover lays flat on the surface and the bottom of the shoe is pressed down on the shoe cover, the length bistable spring band is configured to move to the bias coiling position thereby wrapping the bottom layer around at least the bottom of the shoe from beyond the heel end to beyond the toe end thereby securing the bottom layer on the bottom of the shoe.

4. The step-on shoe cover of claim 1, wherein the at least one bistable spring band includes at least one width bistable spring band configured to extend a width of the bottom layer, the width of the bottom layer and the at least one width bistable spring band being sized to extend from beyond an inner side of the bottom of the shoe to beyond an outer side of the bottom of the shoe.

5. The step-on shoe cover of claim 4, wherein:
   when the at least one width bistable spring band is in the stable planar position, the shoe cover is configured to lay flat on a surface; and
   when the shoe cover lays flat on the surface and the bottom of the shoe is pressed down on the shoe cover, the at least one width bistable spring band is configured to move to the bias coiling position thereby wrapping the bottom layer around at least the bottom of the shoe from beyond the inner side to beyond the outer side thereby securing the bottom layer on the bottom of the shoe.

6. The step-on shoe cover of claim 4, wherein the at least one width bistable spring band including:
   a ball width bistable spring band configured to extend a ball width of the bottom layer, the ball width of the bottom layer and the ball width bistable spring band being sized to extend from beyond an inner ball edge of the bottom of the shoe to beyond an outer ball edge of the bottom of the shoe; and
   a heel width bistable spring band configured to extend a heel width of the bottom layer, the heel width of the bottom layer and the heel width bistable spring band being sized to extend from beyond an inner heel edge of the bottom of the shoe to beyond an outer heel edge of the bottom of the shoe.

7. The step-on shoe cover of claim 6, wherein:
   when the ball width bistable spring band and the heel width bistable spring band are in the stable planar position, the shoe cover is configured to lay flat on the surface; and
   when the shoe cover lays flat on the surface and the bottom of the shoe is pressed down on the shoe cover, the ball width bistable spring band and the heel width bistable spring band are configured to move to the bias coiling position thereby wrapping the bottom layer around at least the bottom of the shoe from beyond the inner ball edge to beyond the outer ball edge, and from beyond the inner heel edge to beyond the outer heel edge, thereby securing the bottom layer on the bottom of the shoe.

8. The step-on shoe cover of claim 1, wherein the at least one bistable spring band including:
   a ball width bistable spring band configured to extend a ball width of the bottom layer, the ball width of the bottom layer and the ball width bistable spring band being sized to extend from beyond an inner ball edge of the bottom of the shoe to beyond an outer ball edge of the bottom of the shoe; and
   a heel width bistable spring band configured to extend a heel width of the bottom layer, the heel width of the bottom layer and the heel width bistable spring band being sized to extend from beyond an inner heel edge of the bottom of the shoe to beyond an outer heel edge of the bottom of the shoe.

9. The step-on shoe cover of claim 8, wherein:
   when the length bistable spring band, the ball width bistable spring band, and the heel width bistable spring band are in the stable planar position, the shoe cover is configured to lay flat on a surface, and the shoe cover extending from a first end of the length bistable spring band approximate to the toe end to ends of the ball width bistable spring band, from the ends of the ball width bistable spring band, to ends of the heel width bistable spring band, and from the ends of the heel width bistable spring band to a second end of the length bistable spring band approximate the heel end to create a substantial hexagon shape with rounded corners; and when the shoe cover lays flat on the surface and the bottom of the shoe is pressed down on the shoe cover, the length bistable spring band, the ball width bistable spring band, and the heel width bistable spring band are configured to move to the bias coiling position thereby wrapping the bottom layer around at least the bottom of the shoe from beyond the heel end to beyond the toe end, beyond the inner ball edge to beyond the outer ball edge, and from beyond the inner heel edge to beyond the outer heel edge, thereby securing the bottom layer on the bottom of the shoe.

10. The step-on shoe cover of claim 1, wherein each of the at least one bistable spring bands including cap covers on each end of the at least one bistable spring band, said cap covers being configured to suspend their respective bistable spring bands above a surface when flat on the surface.

11. The step-on show cover of claim 10, wherein the cap covers suspending their respective bistable spring bands a set distance above the surface configured for allowing the bistable spring bands to move from the stable planar position to the bias coiling position.

12. The step-on shoe cover of claim 10, wherein said cap covers including rounded outer shapes configured for protecting the shoe cover from the ends of the bistable spring bands.

13. The step-on shoe cover of claim 1, wherein each of the at least one bistable spring bands being steel bands pressed into an arch configured for making each of the at least one bistable spring bands configured to have the stable planar position and the bias coiling position.

14. The step-on shoe cover of claim 13, wherein the steel bands being high yield temper 301 stainless steel bands with a thickness of 0.008 inches, pressed into an arch with a bending angle of 1 degree to 180 degrees.

15. The step-on shoe cover of claim 1, wherein the bottom layer including a bottom surface configured for walking.

16. The step-on shoe cover of claim 1 further comprising:
a top layer, said top layer being sized to match the bottom layer, said top layer being attached to said bottom layer with said at least one bistable spring band positioned therebetween;
wherein said top layer including a top surface configured for grip, comfort, or combinations thereof; and
wherein said top layer and said bottom layer being sewn together via a pattern including pockets for each of the at least one bistable spring bands; and
an elastic member positioned between the at least one bistable spring band and said top layer around the shoe cover in a channel approximate a perimeter created by the sewn pattern, wherein:
  when the at least one bistable spring band is in the stable planar position, said elastic member being configured to stretch to allow the shoe cover to lay substantially flat on a surface;
  when the shoe cover lays flat on the surface and the bottom of the shoe is pressed down on the shoe cover and the at least one bistable spring band moves to the bias coiling position, said elastic member being configured to constrict to wrap the perimeter of the shoe cover around at least the bottom of the shoe thereby securing the shoe cover on the bottom of the shoe; and
  when the at least one bistable spring band is in the bias coiling position where the bottom layer is wrapped around at least the bottom of the shoe and the shoe cover is secured on the bottom of the shoe, said elastic member being configured to stretch to allow the at least one bistable spring band to be unrolled and straightened out into the stable planar position thereby unwrapping the bottom layer from at least the bottom of the shoe.

17. A step-on shoe cover comprising:
a bottom layer sized to cover at least a bottom of a shoe;
at least one bistable spring band attached to said bottom layer;
said at least one bistable spring band having a stable planar position and a bias coiling position:
  said stable planar position is configured to hold the bottom layer flat; and
  said bias coiling position is configured to wrap the bottom layer around at least the bottom of the shoe;
a top layer, said top layer being sized to match the bottom layer, said top layer being attached to said bottom layer with said at least one bistable spring band positioned therebetween, said top layer including a top surface configured for grip, comfort, or combinations thereof;
wherein, said top layer and said bottom layer being sewn together via a pattern including pocket for each of the at least one bistable spring bands; and
an elastic member positioned between the at least one bistable spring band and said top layer around the shoe cover in an outer channel approximate a perimeter created by the sewn pattern, wherein:
  when the at least one bistable spring band is in the stable planar position, said elastic member being configured to stretch to allow the shoe cover to lay substantially flat on a surface;
  when the shoe cover lays flat on the surface and the bottom of the shoe is pressed down on the shoe cover and the at least one bistable spring band moves to the bias coiling position, said elastic member being configured to constrict to wrap the perimeter of the shoe cover around at least the bottom of the shoe thereby securing the shoe cover on the bottom of the shoe; and
  when the at least one bistable spring band is in the bias coiling position where the bottom layer is wrapped around at least the bottom of the shoe and the shoe cover is secured on the bottom of the shoe, said elastic member being configured to stretch to allow the at least one bistable spring band to be unrolled and straightened out into the stable planar position thereby unwrapping the bottom layer from at least the bottom of the shoe.

18. A step-on shoe cover comprising:
a bottom layer sized to cover at least a bottom of a shoe;
at least one bistable spring band attached to said bottom layer;
said at least one bistable spring band having a stable planar position and a bias coiling position:
  said stable planar position is configured to hold the bottom layer flat; and
  said bias coiling position is configured to wrap the bottom layer around at least the bottom of the shoe;
wherein each of the at least one bistable spring bands including cap covers on each end of the at least one bistable spring band, said cap covers being configured to suspend their respective bistable spring bands above a surface when flat on the surface;
wherein the cap covers suspending their respective bistable spring bands a set distance above the surface configured for allowing the bistable spring bands to move from the stable planar position to the bias coiling position.

* * * * *